No. 883,083. PATENTED MAR. 24, 1908.
J. C. CALVERT.
TRIP FOR HAY NETS.
APPLICATION FILED SEPT. 19, 1907.

2 SHEETS—SHEET 1.

Witnesses
L. B. James
M. J. Miller

Inventor
J. C. Calvert
By Chandler & Chandler
Attorneys

No. 883,083. PATENTED MAR. 24, 1908.
J. C. CALVERT.
TRIP FOR HAY NETS.
APPLICATION FILED SEPT. 19, 1907.
2 SHEETS—SHEET 2.
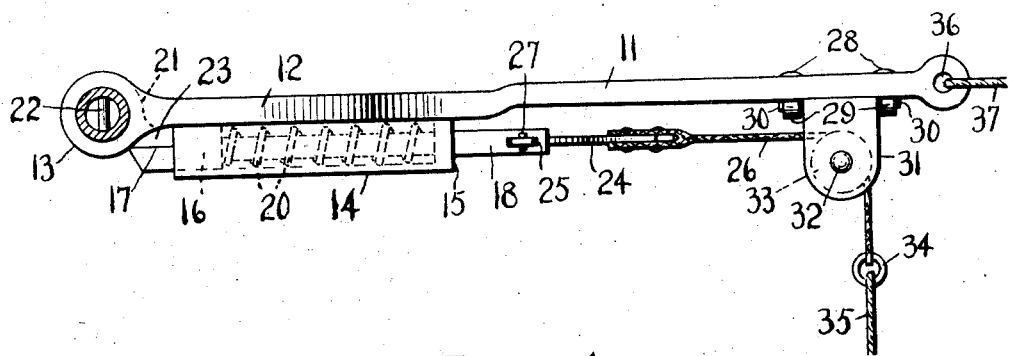
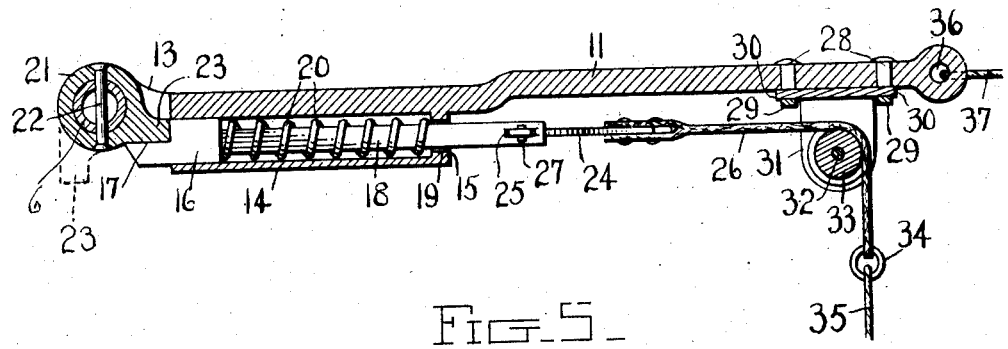
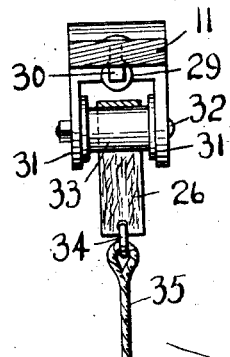
Witnesses
L. B. James
M. J. Miller.
Inventor
J. C. Calvert
By Chandler & Chandler
Attorneys
THE NORRIS PETERS CO., WASHINGTON, D. C.

UNITED STATES PATENT OFFICE.

JOHN C. CALVERT, OF GOLCONDA, NEVADA.

TRIP FOR HAY-NETS.

No. 883,083.  Specification of Letters Patent.  Patented March 24, 1908.

Application filed September 19, 1907. Serial No. 393,743.

*To all whom it may concern:*

Be it known that I, JOHN C. CALVERT, a citizen of the United States, residing at Golconda, in the county of Humboldt, State of Nevada, have invented certain new and useful Improvements in Trips for Hay-Nets; and I do hereby declare the following to be a full, clear, and exact description of the invention, such as will enable others skilled in the art to which it appertains to make and use the same.

This invention relates to trips for hay nets, and has for its object to provide a trip which will work easily and which will, at the same time be very simple, of construction, and will consequently not be liable to become disarranged or clogged by the hay in the net.

Broadly stated, the invention consists in the provision of a hay-net having one of its bars rotatable and in providing upon this bar a number of pins with which are loosely engaged rings carried at the ends of certain of the cords of the net. Normally the bar is in such position that the rings will be held against disengagement from the pins and the bar is held in its position by means of a spring trip embodying my invention, which trip is normally in engagement with a lug formed upon a collar fixedly carried by the bar, the trip being operable to disengage from the lug and permit rotation of the bar whereupon the net will separate and drop the hay.

Figure 1:
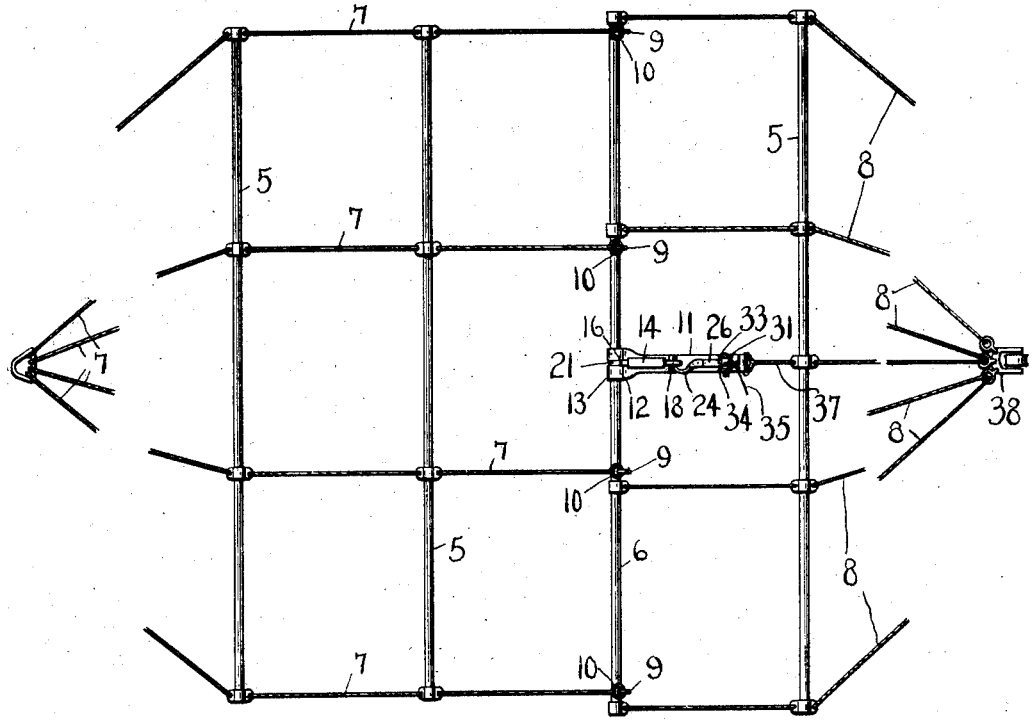
Figure 2:
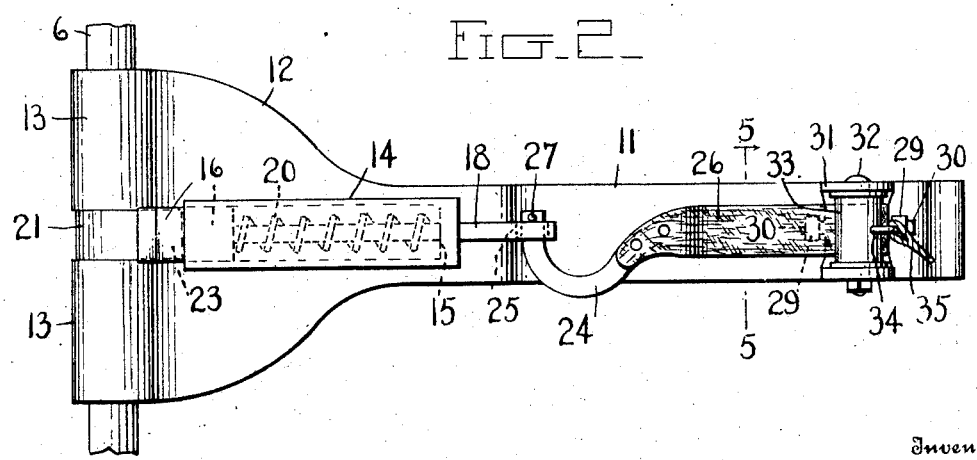

In the accompanying drawings, Figure 1 is a plan view of a net embodying the trip device, Fig. 2 is a plan view in detail of the trip, the lug being shown engaged with the trip, Fig. 3 is a side elevation of the trip showing the lug so engaged, Fig. 4 is a vertical longitudinal sectional view through the trip showing the lug so engaged in full lines, and released in dotted lines, and, Fig. 5 is a vertical transverse sectional view on the line 5—5 of Fig. 2.

In the drawings the net is shown as comprising a plurality of bars 5, which are preferably of hollow tubular construction and a bar 6, which is the rotary bar, as will be hereinafter explained. Two of the bars 5 and a plurality of cords, or chains, 7, form substantially one half of the net, the other half being formed by the other bar 5, the bar 6, and a plurality of cords 8.

The pairs of pins 9 are formed on or secured upon the rotatable bar 6, and with these pins are normally engaged rings 10, which are carried at the free ends of the cables, or cords, 7.

The trip embodied in my invention consists of a plate 11, having one of its ends considerably broadened as at 12, and formed with spaced alining sleeves 13, in which the bar 6 is rotatably received, said trip device being located, as is shown in Fig. 1, substantially at the middle of the bar 6. An oblong casing 14 is formed upon the plate 11 and this casing has one of its ends closed, as at 15, its other end, which is the end presented in the direction of the sleeves, 13, and in this casing is slidably received a latch consisting of a head 16 recessed as at 17, upon its upper side, and a shank 18 which is formed integrally with the head and which is slidable through an opening 19, formed in the closed end 15 of the casing. A spring 20 is engaged upon the shank 18 and bears at one of its ends against the head 16 and at its opposite end against the closed end 15 of the casing. A collar 21 is fixed by means of a rivet, 22, upon the rotatable bar 6, between the sleeves 13 upon the plate 11 and formed integrally with this collar is a lug 23. Normally this lug 23 is engaged beneath the latch head 16, or in other words, in the recess 17 therein, and between this portion of the latch-head and the corresponding portion of the plate 11. But, it will be understood that should the latch 16 be retracted, against the action of the spring 20, it would disengage from the lug 23 and the weight of the chain and the net bearing upon the cables 7, would serve to rotate the bar 6 and, as a consequence, the rings 10 will become disengaged from the pins 9 thereby permitting the two portions of the net to separate and allowing the hay to discharge from the net. In order that the latch may be so retracted to produce the results stated, a hook-shaped member 24 is engaged through the slots 25 formed in the rear end of the latch stem 18, and to the other end of this hook-shaped member is connected a strap 26 the function of which will be presently made clear. A pin 27 is passed through the first-mentioned end of the hook-shaped member 24 and prevents disengagement of the member from the latch-stem.

Studs 28 are engaged through the plate 11 adjacent the end thereof opposite to its broadened end and these studs are formed with eyes 29 in which are loosely received trunnions 30 which project from opposite ends of the bearing bracket 31, through the spaced sides of which is engaged a bolt 32 carrying a rotatable roller 33, over which the strap 26 is passed, said strap being provided at its free end with a ring 34 for the attachment of the cable 35 by means of which a pull may be exerted upon the strap to retract the latch 16. As will be readily understood, and is clearly shown in the drawings, the trunnions 30 are presented towards the respective ends of the plate 11 and as the bracket in which the roller 33 is journaled may have a rocking movement in a direction transversely of the plate, consequently the rope 35 may be pulled from almost any position. To hold the entire trip rigid an eye 36 is formed at the end thereof opposite to its broadened end 12, and secured in this eye is one end of a cable 37, which is connected with the pull block 38 to which the cables 8 lead.

What is claimed, is,

In a hay-loading net, the combination with two separable sections, a bar permanently secured to one section and removably connected to the other section, and a collar rigidly secured upon said bar, and provided with a lug, of a plate loosely connected with the bar a latch mounted upon the plate for coöperation with the lug upon the collar, a bracket mounted upon the plate for rocking movement transversely thereof, a roller journaled in the bracket, and a hook-shaped member engaged through the stem of the latch, and a strap secured to said member and passed over the roller.

In testimony whereof, I affix my signature, in presence of two witnesses.

JOHN C. CALVERT.

Witnesses:
H. J. SUMMERS,
BART DENNERY.